UNITED STATES PATENT OFFICE.

GEORGE H. FRITZSCHE, OF BROOKLYN, NEW YORK, ASSIGNOR TO TAPLEX CORPORATION, OF NEW YORK, N. Y., A CORPORATION OF NEW YORK.

FUEL AND THE METHOD OF PRODUCING THE SAME.

1,342,799.     Specification of Letters Patent.     Patented June 8, 1920.

No Drawing.     Application filed January 24, 1919. Serial No. 272,853.

*To all whom it may concern:*

Be it known that I, GEORGE H. FRITZSCHE, a citizen of Germany, and resident of the borough of Brooklyn, in the city and State of New York, have invented a new and useful Improvement in Fuel and the Methods of Producing the Same, of which the following is a specification.

The object of my invention is to produce a new fuel which will be especially well adapted for use in heating devices of the substantially closed portable type; such as food warmers, bed warmers, body, foot and hand warmers, etc.; which fuel is molded into sticks or bricks which may or may not be provided with inflammable wrappers; which fuel can be readily ignited and will burn very slowly in a confined space without danger of being extinguished and without liberating smoke or poisonous gases.

The fuel consists of a mixture of pulverized charcoal, asbestos, a suitable agent, such as sodium hydroxid which will, when heated, neutralize poisonous gases, and a suitable binding agent, such as lime.

In preparing the fuel I proceed as follows:

I dissolve the sodium hydroxid and lime in water at a normal temperature. I thoroughly mix the charcoal and asbestos dry in a suitable container and then add the solution thereto and thoroughly mix the ingredients. This plastic mass is then pressed in its damp state in cold molds. The sticks or bricks are then dried slowly at a comparatively low heat. They may then be provided with suitable inflammable wrappers such as paper wrappers for serving the double purpose of cleanliness and facilitating the igniting of the fuel.

The charcoal which I prefer to use is that burned from hard wood and the asbestos I prefer to use is the long fiber asbestos so as to separate the particles of charcoal to produce the best results.

While I have mentioned sodium hydroxid as the poison gas neutralizing agent and the lime as the binding agent it is to be understood that I may use any other suitable agents.

The use of the neutralizing agent in the fuel permits the charcoal to be used without danger in a substantially closed space.

The proportions of the several ingredients which I have found best are as follows: pulverized charcoal $94\tfrac{1}{2}$–$91\tfrac{1}{2}$ parts, asbestos 2–5 parts, sodium hydroxid 2 parts, lime $1\tfrac{1}{4}$ parts, water 40 parts.

What I claim is:

A fuel consisting of a mixture of pulverized charcoal, asbestos fiber, lime and sodium hydroxid mixed in substantially the following proportions: charcoal $94\tfrac{1}{2}$–$91\tfrac{1}{2}$ parts, asbestos fiber 2–5 parts, lime $1\tfrac{1}{2}$ parts, sodium hydroxid 2 parts.

In testimony, that I claim the foregoing as my invention, I have signed my name this 16th day of January, 1919.

GEORGE H. FRITZSCHE.